United States Patent
Qiu et al.

(10) Patent No.: US 9,655,011 B2
(45) Date of Patent: *May 16, 2017

(54) COMMUNICATION SYSTEM, NETWORK HANDOVER PROCESSING METHOD AND APPARATUS

(71) Applicant: HUAWEI TECHNOLOGIES CO., LTD., Shenzhen, Guangdong (CN)

(72) Inventors: Yong Qiu, Shenzhen (CN); Min Huang, Shanghai (CN); Ying Huang, Shenzhen (CN); Hongzhuo Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,834

(22) Filed: Jun. 29, 2015

(65) Prior Publication Data

US 2015/0304900 A1 Oct. 22, 2015

Related U.S. Application Data

(63) Continuation of application No. 13/797,587, filed on Mar. 12, 2013, now Pat. No. 9,072,011, which is a (Continued)

(30) Foreign Application Priority Data

Aug. 22, 2007 (CN) .......................... 2007 1 0076513

(51) Int. Cl.
*H04W 36/00* (2009.01)
*H04W 76/02* (2009.01)

(52) U.S. Cl.
CPC .... *H04W 36/0033* (2013.01); *H04W 36/0011* (2013.01); *H04W 36/0055* (2013.01); *H04W 76/027* (2013.01); *H04W 36/0066* (2013.01)

(58) Field of Classification Search
CPC ......... H04W 36/0011; H04W 36/0033; H04W 36/0055; H04W 36/0066; H04W 76/027
(Continued)

(56) References Cited

U.S. PATENT DOCUMENTS 5,913,167 A 6/1999 Bonta et al.
6,381,457 B1 4/2002 Carlsson et al.
(Continued)

FOREIGN PATENT DOCUMENTS

CN 1347257 A 5/2002
CN 1784061 A 6/2006
(Continued)

OTHER PUBLICATIONS

3GPP TSG RAN WG2#59 R2-073483,"Radio Link Failure recovery clarifications",Nortel,Aug. 20-24, 2007,total 3 pages.
(Continued)

*Primary Examiner* — Afsar M Qureshi
(74) *Attorney, Agent, or Firm* — Huawei Technologies Co., Ltd.

(57) ABSTRACT

A communication system, a network handover processing method and a network handover processing apparatus are disclosed. The method includes receiving, by a target evolution NodeB (T-eNB), identity information sent from a user equipment (UE), the identity information being allocated to the UE by a source evolution NodeB (S-eNB); and sending, by the T-eNB, parameters to the UE if identity information, matching the received identity information sent from the UE, is available in the T-eNB, wherein the parameters are allocated to the UE. The apparatus includes a receiving module and a sending module.

13 Claims, 4 Drawing Sheets

Related U.S. Application Data continuation of application No. 12/683,824, filed on Jan. 7, 2010, now Pat. No. 8,406,194, which is a continuation of application No. PCT/CN2008/072090, filed on Aug. 21, 2008.

(58) Field of Classification Search
USPC .................................................. 370/329, 331
See application file for complete search history.

(56) References Cited

U.S. PATENT DOCUMENTS

| | | | |
|---|---|---|---|
| 7,782,818 B2 | 8/2010 | Hurtta et al. | |
| 7,953,043 B2 | 5/2011 | Kim et al. | |
| 8,279,837 B2* | 10/2012 | Qiu | H04W 36/0055 370/331 |
| 8,406,194 B2* | 3/2013 | Qiu | H04W 36/0055 370/331 |
| 9,072,011 B2* | 6/2015 | Qiu | H04W 36/0055 |
| 2002/0077142 A1 | 6/2002 | Sato et al. | |
| 2005/0124344 A1 | 6/2005 | Laroia et al. | |
| 2006/0056395 A1 | 3/2006 | Huomo et al. | |
| 2006/0251021 A1 | 11/2006 | Nakano et al. | |
| 2006/0291416 A1 | 12/2006 | Rexhepi et al. | |
| 2007/0230402 A1 | 10/2007 | Kim et al. | |
| 2008/0049674 A1 | 2/2008 | Cha et al. | |
| 2008/0049676 A1* | 2/2008 | Xiang | H04W 8/26 370/331 |
| 2008/0051088 A1 | 2/2008 | Tariq et al. | |
| 2008/0139203 A1 | 6/2008 | Ng et al. | |
| 2008/0240439 A1* | 10/2008 | Mukherjee | H04W 28/06 380/272 |
| 2008/0267127 A1 | 10/2008 | Narasimha et al. | |
| 2009/0036129 A1 | 2/2009 | Harada et al. | |
| 2009/0061878 A1* | 3/2009 | Fischer | G08C 17/02 455/436 |
| 2009/0073933 A1 | 3/2009 | Madour et al. | |
| 2009/0156212 A1 | 6/2009 | Motegi et al. | |
| 2009/0201881 A1 | 8/2009 | Chun et al. | |
| 2010/0113033 A1 | 5/2010 | Qiu et al. | |
| 2010/0238799 A1* | 9/2010 | Sebire | H04M 15/8038 370/225 |
| 2010/0284370 A1 | 11/2010 | Samar et al. | |
| 2012/0021749 A1* | 1/2012 | Qiu | H04W 36/0055 455/438 |

FOREIGN PATENT DOCUMENTS

| | | |
|---|---|---|
| CN | 1859791 A | 11/2006 |
| CN | 1930794 A | 3/2007 |
| CN | 1957625 A | 5/2007 |
| CN | 1997200 A | 7/2007 |
| CN | 101212775 A | 7/2008 |
| EP | 1345370 A2 | 9/2003 |
| EP | 1418711 A2 | 5/2004 |
| EP | 1983775 A1 | 10/2008 |
| EP | 2584834 A1 | 4/2013 |
| WO | 2005036912 A2 | 4/2005 |
| WO | 2006057878 A2 | 6/2006 |

OTHER PUBLICATIONS

3GPP TS 36.300 V8.1.0,3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 8),Jun. 2007,total 106 pages.

3GPP TSG RAN WG2 #56 Tdoc-R2-063393,"Redirection upon RRC establishment",NTT DoCoMo, Inc.,Nov. 6-10, 2006,total 5 pages.

3GPP TSG-RAN WG2 #58bis R2-072598,"Access procedure after radio link failure",QUALCOMM Europe,Jun. 25-29, 2007,total 2 pages.

3GPP TSG-RAN WG2 #50 meeting R2-060078,"Handover procedure for LTE_ACTIVE UEs",Samsung, Jan. 9-13, 2006,total 6 pages.

3GPP TSG-RAN WG3 #55 R3-070448,"Assembly of Intra-E-UTRAN handover command",Ericsson, Feb. 12-16, 2007,total 6 pages.

3GPP TS 25.331 V7.4.0 (Mar. 2007), published in Mar. 2007,total 6 pages.

3GPP TS 36.300 V0.4.0(Jan. 2007), 3rd Generation Partnership Project;Technical Specification Group Radio Access Network, Evolved Universal Terrestrial Radio Access (E-UTRA) and Evolved Universal Terrestrial Radio Access Network (E-UTRAN); Overall description;Stage 2(Release 8), Jan. 2007,total 76 pages.

3GPP TSG-RAN WG2 Meeting #58 R2-071717(R2-071231),"Handover Failure Recovery",Nokia,NSN, May 7-11, 2007, total 4 pages.

3GPP TSG-RAN WG2 #58 T-doc R2-071824,"Radio link failure at handover",Ericsson, May 7-11, 2007,total 4 pages.

3GPP TSG-RAN WG2 Meeting #58 R2-071980,"Forward Hand-Off options",Nortel, May 7-11, 2007,total 6 pages.

3GPP TSG-RAN WG2 Meeting #58 R2-072382,"Radio Link Failure Recovery",Nokia Siemens Networks et al.,Jun. 25-29, 2007,total 8 pages.

3GPP TSG-RAN#59 WG 2 LTE R2-073142,"Resource handling during radio link failure",Alcatel-Lucent,Aug. 20-24, 2007,total 4 pages.

3GPP TSG-RAN WG2 Meeting #58 R2-071716(R2-071229),"Radio Link Failure and Context Recovery",Ericsson et al.,May 1-11, 2007,total 3 pages.

3GPP2 X.S0011-001-D,Version: 1.0,"cdma2000 Wireless IP Network Standard: Introduction", Version Date: Feb. 2006,total 33 pages.

* cited by examiner

COMMUNICATION SYSTEM, NETWORK HANDOVER PROCESSING METHOD AND APPARATUS

CROSS-REFERENCE TO RELATED APPLICATIONS

This application is a continuation of U.S. patent application Ser. No. 13/797,587, filed on Mar. 12, 2013, and now U.S. Pat. No. 9,072,011 issued on Jun. 30, 2015, which is a continuation of U.S. patent application Ser. No. 12/683,824, filed on Jan. 7, 2010 and now U.S. Pat. No. 8,406,194, issued on Mar. 26, 2013, which is a continuation of International Application No. PCT/CN2008/072090 filed on Aug. 21, 2008. The International Application claims priority to Chinese Patent Application No. 200710076513.0, filed on Aug. 22, 2007. The afore-mentioned patent applications are hereby incorporated by reference in their entireties.

TECHNICAL FIELD

The present invention relates to a wireless communication technology, and in particular, to a communication system, a network handover processing method and a network handover processing apparatus.

BACKGROUND

In evolved network architecture, the handover of an X2 interface takes place between Evolved NodeBs (eNodeBs). An eNodeB where a User Equipment (UE) is currently located is called a Source eNodeB (S-eNB). An eNodeB to which the UE is handed over is called a Target eNodeB (T-eNB). The handover is a process of handing over the UE from a cell controlled by the S-eNB to a cell controlled by the T-eNB.

The handover process in the prior art is as follows.

The UE context in the S-eNB includes roaming restriction information. The information is provided at the setup of a connection or the update of a last Tracking Area (TA).

According to the measurement result of the UE and the Radio Resource Management (RRM) of the S-eNB, the S-eNB determines to hand over the UE to a cell controlled by the T-eNB.

The S-eNB sends a handover request message to the T-eNB. The message carries mandatory information for the handover preparation on the T-eNB, including: MME UE S1AP ID (identity), old enb UE S1AP ID, target cell ID, Radio Resource Control (RRC) context, and System Architecture Evolution (SAE) bearer context. The T-eNB addresses the S-eNB and the Evolved Packet Core (EPC) according to MME UE S1AP ID or enb UE S1AP ID. The SAE bearer context includes the mandatory address information of the radio network layer and transport network layer, the Quality of Service (QoS) profile of the SAE bearer, and possible configuration information of the access layer. The T-eNB is configured with necessary resources.

The T-eNB implements admission control to improve the handover success possibility according to the received QoS profile of the SAE bearer. If the T-eNB is able to meet the resource requirement of the SAE bearer, the T-eNB allocates appropriate resources according to the received QoS profile of the SAE bearer and meanwhile, reserves a Cell-Radio Network Temporary Identifier (C-RNTI).

The T-eNB sends a handover request ACK message to the S-eNB. The message carries the newly allocated C-RNTI and parameters, for example, access parameters, Radio Network Layer (RNL) and/or Transport Network Layer (TNL) information for setting up a forwarding tunnel.

The UE receives a handover command message sent from the S-eNB. According to the message, the UE implements the handover process. The message carries the newly allocated C-RNTI and possible start time.

If the target cell is accessed successfully, the UE sends a handover confirm message to the T-eNB, indicating that the handover is complete. The T-eNB checks whether the C-RNTI in the message is allocated by itself.

The T-eNB sends a handover complete message to the EPC, indicating that the UE have changed the cell. The EPC hands over the data path to the T-eNB and releases the relevant user plane resources and transport network layer resources of the S-eNB.

The EPC sends a handover complete ACK message to the T-eNB to confirm that the handover is complete.

The T-eNB sends a release resource message to the S-eNB to trigger the S-eNB to release resources.

Upon reception of the release resource message, the S-eNB releases the radio resources and control plane resources related to the UE context.

In the above handover preparation process, if the radio link between the S-eNB and the UE fails, the UE changes the state during the subsequent handover. As a result, the handover is delayed and the system resources are wasted.

SUMMARY OF THE INVENTION

Embodiments of the present invention provide a communication system, a network handover processing method and a network handover processing apparatus.

An embodiment of the present invention provides a network handover processing method. A T-eNB receives ID information sent from a UE. The ID information is allocated for the UE by an S-eNB. The T-eNB sends parameters to the UE if identity information that matches the received identity information sent from the UE is available in the T-eNB. The parameters are allocated to the UE by the T-eNB. The handover process is then continued.

A network handover processing apparatus Another embodiment of the present invention provides a network handover processing apparatus. A receiving module is adapted to receive ID information sent from a UE. The ID information is allocated for the UE by an S-eNB. A sending module is adapted to send parameters allocated for the UE to the UE if identity information, matching the received identity information sent from the UE, is available in the T-eNB.

A communication system provided in an embodiment of the present invention includes a UE, an S-eNB and a T-eNB. The UE is adapted to discover a target cell after detecting a radio link failure and to send ID information allocated for the UE by the S-eNB to the T-eNB corresponding to the target cell. The T-eNB is adapted to send parameters allocated for the UE to the UE if the T-eNB has ID information the same as the ID information sent from the UE, and continue the handover process.

The communication system, network handover processing method and network handover processing apparatus in the embodiments of the present invention determine whether the T-eNB is the selected T-eNB during the network handover preparation, that is, check whether the context information of the UE exists by judging whether the T-eNB has ID information the same as the ID information sent from the UE. If the same ID information exists, the handover process is continued. Thus, the state change times of the UE in the network handover process are reduced, and the system resources are saved.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The embodiments of the present invention are hereinafter described in detail with reference to the accompanying drawings.

During the handover preparation in an evolved network, if a radio link failure occurs between the S-eNB and the UE, the UE detects a cell with better signal quality and sends a cell update message to the T-eNB corresponding to the cell. If the cell previously received a handover request message sent from the UE during the handover preparation and the T-eNB stores the context of the UE, the T-eNB may send the parameters such as the air interface resource configuration information, security parameter, and C-RNTI to the UE through a cell update confirm message or other messages so that the handover process can be continued.

During the handover preparation in an evolved network, if a radio link failure occurs between the S-eNB and the UE, the UE detects a cell with better signal quality and sends a cell update message to the T-eNB corresponding to the cell. The ID information allocated by the S-eNB may be carried in the cell update message or other RRC layer access messages sent to the T-eNB. Alternatively, the cell update cause value may be carried in the cell update message or other RRC layer access messages to the T-eNB. The T-eNB checks whether identity information, matching the received identity information sent from the UE, is available in the T-eNB, if identity information is available in the T-eNB, it indicates that the context of the UE does exist in the T-eNB. In this case, the T-eNB delivers the relevant radio parameter information, security parameter, and C-RNTI to the UE. The handover process is continued. The specific process is described below with reference to FIG. 1.

Step 101: The S-eNB sends a handover request message to a candidate T-eNB. One or more candidate T-eNBs may be available. Accordingly, the S-eNB may send a handover request message to one or more candidate T-eNBs. In this embodiment, two candidate T-eNBs are selected, that is, T-eNB1 and T-eNB2.

The handover request message carries the ID information allocated for the UE by the S-eNB. For example, the ID information may include one or any combination of: C-RNTI, S-TMSI, other ID of UE, source cell ID, and S-eNB ID.

Figure 1:
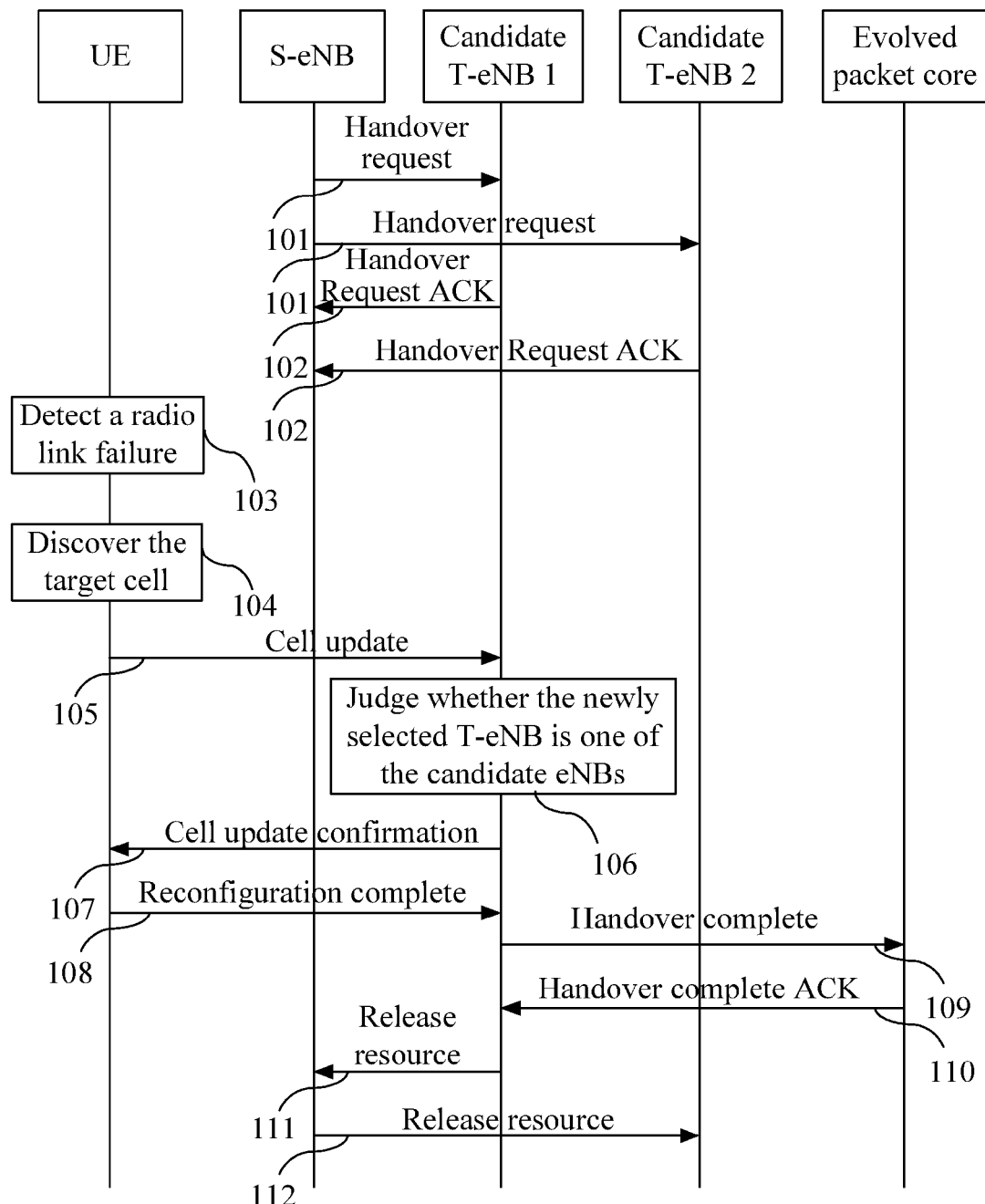
FIG. 1 shows a first flowchart of a network handover processing method according to an embodiment of the present invention.

Step 102: If the candidate T-eNBs accept the handover request and respond with a handover request ACK message, the S-eNB may receive multiple handover request ACK messages from different candidate T-eNBs. As shown in FIG. 1, the candidate T-eNB1 and T-eNB2 respectively send a handover request ACK message to the S-eNB. Through the handover request ACK message, the candidate T-eNBs may allocate a new C-RNTI to the UE. The security parameter and radio configuration parameter container may also be allocated. The radio configuration parameter container may include the Radio Bearer (RB) and Packet Data Convergence Protocol (PDCP) parameters. This embodiment does not limit the parameters that can be allocated by the candidate T-eNBs.

Step 103: The UE detects that the radio link between the UE and the S-eNB fails.

Step 104: The UE finds a target cell with better signal quality and connects to the cell.

Step 105: The UE sends a cell update message to an eNB corresponding to the cell, that is, a new T-eNB.

The cell update message carries the ID information allocated by the S-eNB. For example, the ID information may include one or any combination of: C-RNTI, S-TMSI, other ID of UE, source cell ID, and S-eNB ID.

Further, the cell update message may carry a cell update cause value, for example, "radio link failure."

Step 106: The new T-eNB judges whether itself is the candidate T-eNB selected in step 101.

Upon reception of the cell update message, the new T-eNB obtains the ID information that is allocated for the UE by the S-eNB and carried in the message, and queries whether identity information, matching the received identity information sent from the UE, is available in the T-eNB. If the identity information is available in the T-eNB, it indicates that the context of the UE does exist in the T-eNB; that is, the new T-eNB is the candidate T-eNB selected in step 1, and the process goes to step 107. If the identity information isn't available in the T-eNB, the T-eNB sends a cell update Failure message to the UE and ending the process. In FIG. 1, the T-eNB selected by the UE is the T-eNB1.

Step 107: The new T-eNB constructs a cell update confirm message and sends the message to the UE. The message carries the parameters allocated for the UE by the T-eNB. The message may carry the security parameter, C-RNTI parameter, and parameters in the radio configuration parameter container. This embodiment does not limit the parameters that can be allocated by the candidate T-eNBs. The condition for keeping the security parameter unchanged is: the UE does not delete the $K_{ENB}$ key during the radio link failure; the UE uses the key after receiving the cell update confirm message.

Step 108: The UE returns a mobility complete message to the T-eNB. The message includes the configuration information of some confirmed radio parameters, for example, RB.

Step 109: Upon reception of the mobile complete message, the T-eNB sends a handover complete message to the mobility management Entity (MME).

Step 110: The MME returns a handover complete ACK message to the T-eNB.

Step 111: The T-eNB notifies the S-eNB to release resources and sends a release resource message to the S-eNB.

Step 112: When multiple candidate T-eNBs are available, the S-eNB sends a release resource message to other candidate T-eNBs.

In this embodiment, the handover request message that the S-eNB sends to the candidate T-eNBs carries the ID information allocated for the UE by the S-eNB. The cell update message that the UE sends after the radio link between the UE and the S-eNB fails also carries the ID information allocated for the UE by the S-eNB. The new T-eNB receiving the cell update message judges whether identity information, matching the received identity information sent from the UE, is available in the T-eNB. If the identity information is available in the T-eNB, the new T-eNB is the candidate T-eNB selected by the UE during the handover preparation, and the context of the UE is already stored. Thus, the T-eNB does not need to obtain the context from the S-eNB, and the handover delay is reduced. The UE can stay in the active state, instead of changing from the active state to the idle state and then changing back to the active state. Thus the state change times are reduced and the system resources are saved.

A second embodiment will now be described.

When the S-eNB detects that the radio link with the UE fails, the S-eNB sends a message to a candidate T-eNB through the X2 interface. The message carries the ID information allocated for the UE by the S-eNB. The specific process is described below with reference to FIG. 2.

Step 201: The S-eNB sends a handover request message to a candidate T-eNB. One or more candidate T-eNBs may be available. Accordingly, the handover request message may be sent to one or more candidate T-eNBs. In this embodiment, two candidate T-eNBs are selected.

Figure 2:
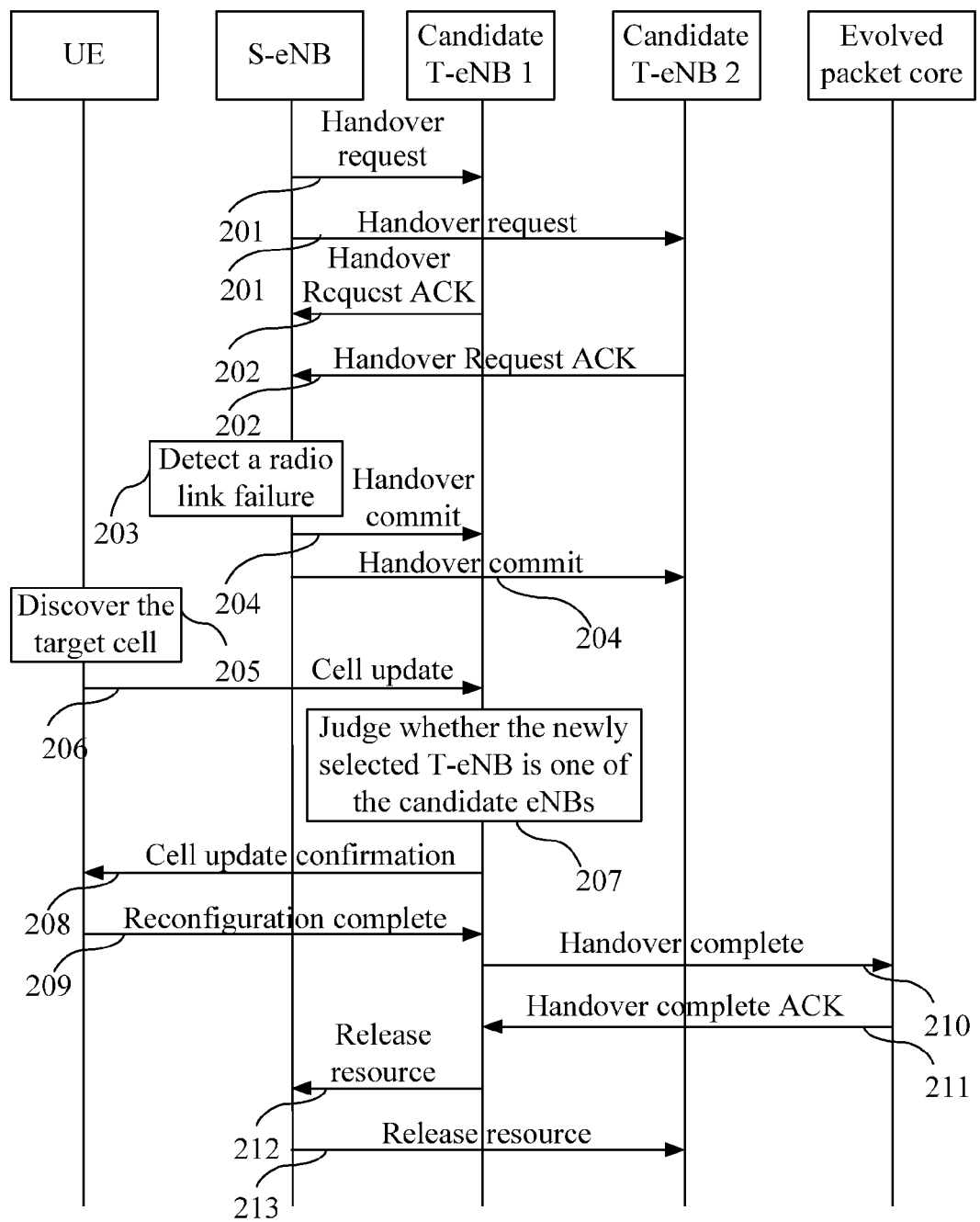
FIG. 2 shows a second flowchart of a network handover processing method according to an embodiment of the present invention.

Step 202: If the candidate T-eNBs accept the handover request, the candidate T-eNBs return a handover request ACK message to the S-eNB. The S-eNB may receive multiple handover request ACK messages from different candidate T-eNBs. As shown in FIG. 2, the candidate T-eNB1 and T-eNB2 respectively return a handover request ACK message to the S-eNB.

Through the handover request ACK message, the candidate T-eNBs may allocate a new C-RNTI to the UE. The security parameter and radio configuration parameter container may also be allocated. The radio parameter container may include the RB and PDCP parameters. This embodiment does not limit the parameters that can be allocated by the candidate T-eNBs.

Step 203: The S-eNB detects that the radio link between the UE and the S-eNB fails.

Step 204: The S-eNB sends a message to one or more candidate T-eNBs through the X2 interface. For example, the message may be a handover commit message and the message carries the ID information allocated for the UE by the S-eNB. For example, the ID information may include one or any combination of: C-RNTI, S-TMSI, other ID of UE, source cell ID, and S-eNB ID.

Steps 205-213 are similar to the corresponding steps in the first embodiment.

The enumerated messages and the carried parameters in this embodiment are exemplary only. The present invention does not limit the specific forms of the messages or specific forms of the parameters carried in the messages.

Figure 3:
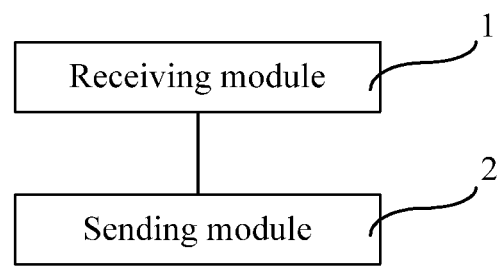
FIG. 3 shows a structure of a network handover processing apparatus according to a first apparatus embodiment of the present invention.

An embodiment of the present invention also provides a network handover processing apparatus. As shown in FIG. 3, the apparatus includes a receiving module 1 and a sending module 2. The receiving module 1 is adapted to receive identity information sent from the UE. The ID information is allocated to the UE by the S-eNB. The sending module 2 is adapted to send the parameters allocated for the UE to the UE if identity information, matching the received identity information sent from the UE, is available in the T-eNB, and to continue the handover process.

In this embodiment, the receiving module 1 receives the ID information allocated for the UE by the S-eNB and queries whether identity information, matching the received identity information sent from the UE, is available in the T-eNB. If the identity information is available in the T-eNB, it indicates that the T-eNB is the candidate T-eNB selected during the handover preparation. The candidate T-eNB has the context information of the UE and can perform the network handover. The T-eNB sends the parameters allocated for the UE to the UE. The parameters may include the security parameter, C-RNTI, RB, and PDCP. The network handover processing apparatus provided in this embodiment can reduce the handover delay. The UE can stay in the active state all along during the network handover, instead of changing from the active state to the idle state and then changing back to the active state. Thus the state change times are reduced and the system resources are saved.

Figure 4:
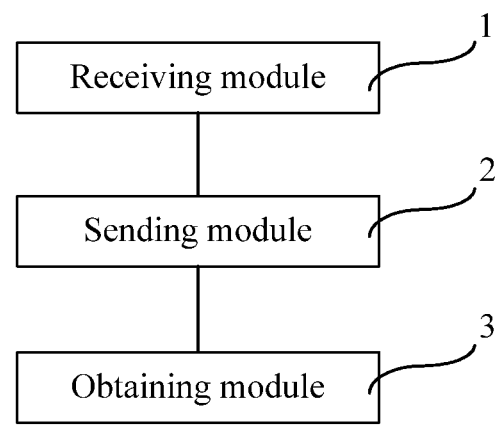
FIG. 4 shows a structure of a network handover processing apparatus according to a second apparatus embodiment of the present invention.

As shown in FIG. 4, based on the foregoing embodiment, the network handover processing apparatus may further include an obtaining module in addition to the receiving module 1 and the sending module 2. The obtaining module 3 is adapted to obtain the ID information sent through the Handover Request message by the S-eNB, or to obtain the ID information sent by the S-eNB after the radio link between the UE and the S-eNB fails.

The ID information received by the receiving module and sent from the UE includes one or any combination of: C-RNTI, S-TMSI, other ID of UE, source cell ID, and S-eNB ID.

The network handover processing apparatus in this embodiment may be set in a NodeB as a functional module of the NodeB. The apparatus can implement the process of the foregoing method embodiment.

Figure 5:
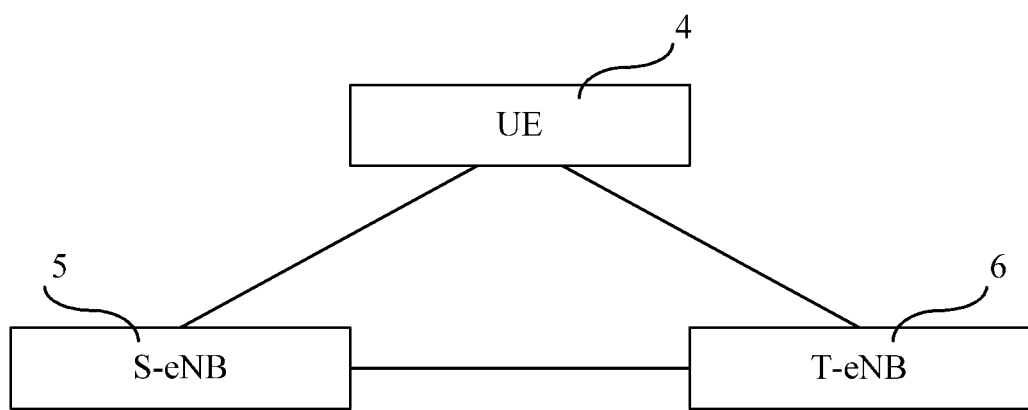
FIG. 5 shows a structure of a communication system according to an embodiment of the present invention.

An embodiment of the present invention provides a communication system. As shown in FIG. 5, the system includes a UE 4, an S-eNB 5, and a T-eNB 6. The UE 4 is adapted to discover a target cell after detecting a radio link failure and to send the ID information allocated for the UE 4 by the S-eNB 5 to a T-eNB 6 corresponding to the target cell. The T-eNB 6 is adapted to send parameters allocated for the UE 4 to the UE 4 if the T-eNB 6 has ID information same as the ID information sent from the UE 4, and to continue the handover process.

In the communication system provided by this embodiment, after the radio link failure occurs during the network handover, the UE sends the ID information to the selected T-eNB. By judging whether the T-eNB has the same ID information, the T-eNB can know whether the T-eNB is the candidate T-eNB selected by the S-eNB during the network handover preparation, that is, whether the context information of the UE exists. If the same ID information exists, the handover process is continued. Thus the state change times are reduced and the handover efficiency is improved. The UE can stay in the active state, instead of changing from the active state to the idle state and then changing back to the active state. Thus the state change times are reduced and the system resources are saved.

The ID information in the T-eNB in this embodiment is sent by the S-eNB. The S-eNB may send the ID information to the T-eNB through a Handover Request message. Alternatively, when the radio link with the UE fails, the S-eNB may send the ID information to the T-eNB.

The T-eNB is further adapted to send the radio bearer configuration parameters to the UE and to continue the handover process. The S-eNB is adapted to send the ID information allocated for the UE to at least one candidate T-eNB.

The communication system provided in this embodiment can enable the UE to stay in the active state all along during the network handover, instead of changing from the active state to the idle state and then changing back to the active state. Thus the state change times are reduced and the system resources are saved.

In the foregoing embodiments, the S-eNB allocates the ID information to the UE and sends the ID information to the candidate T-eNB; when a radio link failure occurs, the UE sends the ID information to the T-eNB; if the T-eNB has the same ID information, it indicates that the T-eNB is one of the candidate T-eNBs and stores the context information of the UE. Hence, the T-eNB does not need to obtain the context from the S-eNB. Therefore, the handover delay is reduced, and the UE can stay in the active state, instead of changing from the active state to the idle state and then changing back to the active state. Thus the state change times are reduced and the system resources are saved.

Although the technical solution of the present invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for performing a network handover process by a target evolved NodeB (eNB), the method comprising:
   receiving first identity information allocated by a source eNB to a user equipment from the target eNB;
   receiving second identity information allocated to the user equipment by the source eNB sent from the user equipment;
   determining that the second identity information matches the first identity information; and
   sending one or more parameters to the user equipment, wherein the one or more parameters are allocated to the user equipment by the target eNB;
   wherein the first identity information and the second identity information each comprise a Cell Radio Network Temporary Identifier (C-RNTI) and a source cell identity.

2. The method according to claim 1, further comprising receiving a cause value sent from the user equipment together with the second identity information.

3. The method according to claim 1, further comprising storing the first identity information.

4. The method according to claim 1, wherein receiving the first identity information comprises receiving a handover request message sent from the source eNB, wherein the handover request message comprises the first identity information allocated to the user equipment by the source eNB.

5. The method according to claim 1, further comprising ending the handover process when the second identity information does not match the first identity information.

6. The method according to claim 4, further comprising:
   receiving a mobility complete message responded by the user equipment;
   sending a handover complete message to a mobility management entity upon reception of the mobile complete message;
   receiving a handover complete ACK message from the mobility management entity; and
   sending a first release resource message to the source eNB, thereby enabling the source eNB to release resources.

7. The method according to claim 6, further comprising, when multiple candidate target eNBs are available, sending a second release resource message to other candidate target eNB(s) of the multiple candidate target eNBs upon the reception of the first release resource message.

8. An evolved NodeB (eNB) in a communication network that is a target eNB in a handover process, the eNB comprising:
   a communication interface, configured to receive from a source eNB, first identity information allocated to a user equipment by the source eNB;
   a receiver, configured to receive second identity information allocated to the user equipment by the source eNB sent from the user equipment;
   a processor, configured to determine the second identity information matches the first identity information and to allocate one or more parameters to the user equipment, wherein the first identity information and the second identity information each comprises a Cell Radio Network Temporary Identifier (C-RNTI) and a source cell identity; and
   a transmitter, configured to send the one or more parameters to the user equipment.

9. The eNB according to claim 8, wherein the receiver is further configured to receive a cause value sent from the user equipment together with the second identity information.

10. The eNB according to claim 8, further comprising a storage unit, configured to store the first identity information received from the source eNB.

11. The eNB according to claim 8, wherein the communication interface is configured to receive a handover request message, sent from the source eNB, wherein the handover request message includes the first identity information allocated to the user equipment by the source eNB.

12. The eNB according to claim 11, wherein
   the receiver is further configured to receive a mobility complete message responded by the user equipment;
   the transmitter is further configured to send a handover complete message to a mobility management entity upon reception of the mobile complete message;
   the receiver is further configured to receive a handover complete ACK message from the mobility management entity; and
   the transmitter is further configured to send a first release resource message to the source eNB, thereby enabling the source eNB to release resources.

13. The eNB according to claim 8, wherein the transmitter is further configured to send, if multiple candidate target eNBs are available, a second release resource message to other candidate target eNB(s) upon reception of the first release resource message.

* * * * *